METHOD OF MANUFACTURING MICROWAVE COMPONENTS
Filed Oct. 20, 1964
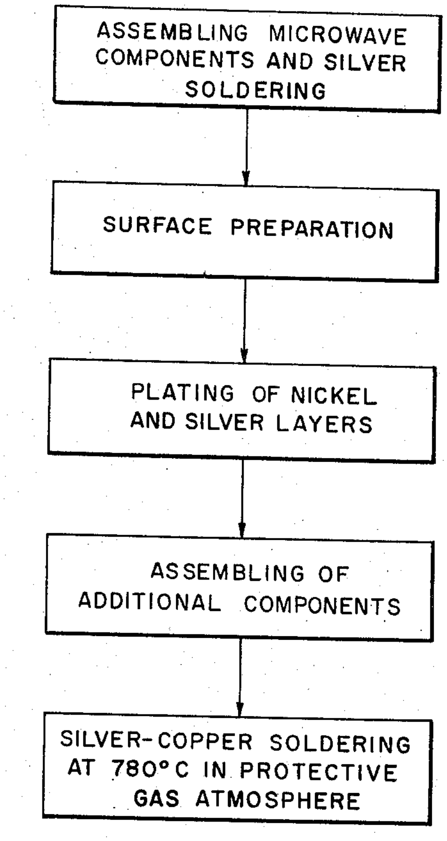
INVENTOR.
HANS KUHN 3,372,471
Patented Mar. 12, 1968

3,372,471

METHOD OF MANUFACTURING MICROWAVE COMPONENTS

Hans Kuhn, Pforzheim, Germany, assignor to International Standard Electric Corporation, New York, N.Y., a corporation of Delaware Filed Oct. 20, 1964, Ser. No. 405,229
Claims priority, application Germany, Oct. 26, 1963, St 21,250
5 Claims. (Cl. 29—600)

The electrical properties of microwave components are determined by the mechanical dimensions of the cavity enclosed by a metallic conductor. This is equally applicable to cavity resonators or coaxial arrangements. The metallic enclosure of the cavity, in order to keep the ohmic losses small, should have a high as possible electrical conductivity which is mostly achieved by subjecting the same to silver plating. This silver plating of the inner surfaces of a total component of complicated structure, is very often rather difficult and, in some cases, even impossible. For this reason it was hitherto necessary, in order to provide a sufficient accessibility for the electroplating, to do without the electrically most favorable shape of the construction, or else the components had to be subdivided into individual subgroups, with mechanical separating points being provided thereon, so as to enable the reassembly of the component parts by way of screwing, subsequent to the plating process. This, however, not only entails higher costs, but in view of the possible poor contact-making, such a measure also has a detrimental effect upon the quality and the reliability of operation of the component.

Up to now it has not yet been tried to subject the plated individual parts to a subsequent soldering within a protective gas envelope, because hitherto it was always considered as an unavoidable prior treatment for the electroplating of a component, to provide it with a copper base in order to provide a better adherence of the layers to be plated thereon. A component provided with such a copper base, however, is incapable of withstanding the high temperatures necessary for effecting the soldering within the protective gas envelope. In fact bubbles are formed in the course of this which may lead to a breaking or destruction of the nickel layer which is usually plated on the copper base.

The present invention provides an improved and more simple method for manufacturing microwave components, in which the subgroups of the components are electroplated in such a way as to enable them to be assembled to form one component by way of a subsequent protective-gas soldering. The invention is characterized by the fact that the components preferably consisting of steel or Invar, and subdivided into several subgroups which are suitable for performing the electroplating, are first of all provided, without requiring any prior deposited copper base, with a layer of nickel having a thickness of several microns, plus serving as the corrosion protection, and that there is provided thereon, likewise by way of electroplating, a layer of silver having a thickness of several microns in order to increase the conductivity, and that thereupon the subgroups, by way of soldering within a protective gas envelope, and by using a solder of good electrical conductivity, preferably a eutectic copper-silver alloy composition, are assembled, and the layers electroplated thereon are fused into the starting material in the course of the heating process forming part of the protective-gas soldering.

In the following the inventive method will now be explained in detail with reference to the accompanying figure which shows the steps of the novel method.

A microwave component is subdivided into subassemblies so that each of these subassemblies will be easily accessible for electroplating. Preferably steel or Invar is used as the base material for the subgroups. Onto this base material, without previously providing a copper base, there is electroplated a layer of nickel having a thickness of several microns for acting as the corrosion preventive, and thereupon there is galvanized a layer of silver having a thickness of several microns, for increasing the conductivity of the inner surface. The thus electroplated subassemblies, by being subjected to soldering within a protective gas envelope, and by using a solder of a good electrical conductivity, preferably of a eutectic copper-silver alloy composition (780° C.) are assembled to form the microwave component. The copper base may be omitted because the heating process forming part of the protective gas soldering effects the necessary intimate adherence of the galvanized nickel layer to the base material.

The individual parts of the subassemblies, for example, the flanges at the ends of the waveguides, are previously assembled to form a subassembly prior to the electroplating. In the course of this they are soldered together by using a solder having a higher melting point, preferably fine silver, within a protective gas envelope such as an inert gas atmosphere. At the points, and only at the points where the silver solder is supposed to flow, there is deposited a layer of copper having a thickness of a few microns (1–3). Due to the excessive silver solder the resulting alloy composition is alloyed to such a high silver content that it will no longer become liquid during the later soldering process of the invention.

From the experiments it has become evident that such alloy compositions comprising components which, at the soldering temperature (800° C.), have a relatively high vapor pressure, are unsuitable for use as the base material. Steel and nickel-iron alloys, however, are suitable. Of the various alloys of nickel and iron, Invar has been subjected to special investigations, because this, as is well-known, remains essentially constant in length over a wide range of temperature, so that resonant circuits and filters consisting of this material (Invar) have a high frequency stability. The surfaces to be electroplated, must be free from microcracks, shrinkages, cavities, and bubbles (air bubbles). In the course of the electroplating treatment care has to be taken that the base material is carefully degreased. Etching is carried out with the aid of hydrochloric acid, or, in the case of invar, also with an etching solution consisting of $FeCl_3$, $KClO_3$ and HCl. Glossy-nickel baths are unsuitable for the nickel plating. A flat-finish nickel bath manufactured by Schering, as well as a Watt's flat-finish nickel bath with a small addition of a wetting agent, has been successfully tried. For the silver plating there first was employed a previous silver bath (high KCN and low Ag-contents) and a subsequent flat-finish silver plating (high KCN-high Ag contents). To carry out the operation at higher current densities, there has been employed a gloss addition as manufactured by Schering, with a silver bath having high Ag contents and an extremely high KCN-contents, namely of more than 100 gr./liter. On account of this it was no longer necessary to employ the previous silver plating stage.

The figure illustrates the various steps which are employed including a first assembling of components and silver soldering, surface preparation of the base material, plating of nickel and silver layers, assembly of additional components and soldering at a temperature of over 780° C. in a protective gas atmosphere so that the heat fuses the plated layers onto the base metal.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A method of producing microwave components by electroplating and thereafter soldering within a protective gas atmosphere, and where said components are formed of a base material of steel having relatively constant length when subjected to heating, and are assembled into several subassemblies which are accessible for performing the plating comprising the steps of plating a layer of nickel on the steel base material of the assembled components, said nickel layer having a thickness of several microns for corrosion protection, plating a layer of silver having a thickness of several microns over the nickel layer to increase conductivity, soldering together within a protective gas atmosphere the several subassemblies with a solder of good electrical conductivity at a temperature which fuses the plated layers into the base material.

2. A method according to claim 1 wherein said base material is etched in a solution of hydrochloric acid.

3. A method according to claim 2 wherein said base material is Invar and is etched in a solution of $FeCl_3$, $KClO_3$ and HCl.

4. A method according to claim 1 wherein said silver electro-plating is carried out in a first silver bath consisting of high KCN and low Ag-content and comprising the subsequent step of applying a flat silver finish by electroplating in a bath of high KCN and high Ag contents.

5. A method according to claim 1 wherein said solder is a eutectic copper-silver alloy composition having a melting temperature of about 780° C.

References Cited

UNITED STATES PATENTS

| | | | |
|---|---|---|---|
| 2,557,823 | 6/1951 | Holbrook | 204—34 |
| 2,627,110 | 2/1953 | Hickey | 29—494 |
| 2,636,083 | 4/1953 | Phillips et al. | 333—95 |
| 2,724,805 | 11/1955 | Smullin | 333—98 X |
| 3,035,990 | 5/1962 | Davis et al. | 204—33 X |
| 3,103,454 | 9/1963 | Scapple et al. | 29—600 X |

WILLIAM I. BROOKS, *Primary Examiner.*

JOHN F. CAMPBELL, *Examiner.*